United States Patent Office.

ANTOINETTE VIDAL, OF PARIS, FRANCE.

Letters Patent No. 90,324, dated May 18, 1869.

---

IMPROVED POROUS PORCELAIN FOR USE IN FILTERING, &c.

---

The Schedule referred to in these Letters Patent and making part of the same.

---

*To all whom it may concern:*

Be it known that I, ANTOINETTE VIDAL, of Paris, in the Empire of France, have invented a new and useful Improvement in the Manufacture of Porous Porcelain; and I do hereby declare the following to be a full, clear, and exact description thereof, which will enable those skilled in the art to make and use the same.

My invention relates to a new sort of porcelain, fit for filtering liquids generally, and which may consequently be used for the manufacture of all sorts of vases and receptacles for filtering-purposes, and to the process by which the said porcelain may be manufactured.

This process consists in mixing, in equal quantities, kaoline and gypsum, and in adding thereto pulverized charcoal, or any analogous pulverized substance, to be driven out, during the process of baking, in variable quantities, according to the degree of porousness desired.

In carrying out my invention, I take gypsum, or plaster of Paris, and mix it with an equal quantity of kaoline, and, to this mixture, I add charcoal or other combustible material, in a pulverized state, and a sufficient quantity of water to produce a plastic mass.

After this mass has been moulded into articles of the required form, I dry said articles, and then I introduce them into an oven, and heat them, so that the charcoal or other combustible material is burned out. By these means, the articles become porous, and fit for filtering and other purposes.

What I claim as new, and desire to secure by Letters Patent, is—

1. A compound for porous porcelain, made of the ingredients herein described, and mixed together, substantially in the manner herein set forth.

2. The process, substantially as described, for producing a porous porcelain, by mixing gypsum and kaoline with charcoal or other analogous material, and subjecting the mixture to heat, so as to burn out the charcoal or analogous material, as set forth.

A. VIDAL.

Witnesses:
   W. BONNEVILLE,
   F. OLCOTT.